DIFFERENTIAL DIODE SIGNAL SEEKING INTELLIGENCE SYSTEM WITH SERIES RELAY SWITCHING CIRCUIT

Filed Nov. 30, 1956

2 Sheets-Sheet 1

INVENTOR

FRANKLIN E. TAYLOR

BY

Moran, Kolehmainen, Rathburn & Wyss

ATTORNEYS

INVENTOR
FRANKLIN E. TAYLOR
BY
Mason, Kolehmainen, Rathburn and Wyss
ATTORNEYS

United States Patent Office 2,941,071

Patented June 14, 1960

2,941,071

DIFFERENTIAL DIODE SIGNAL SEEKING INTELLIGENCE SYSTEM WITH SERIES RELAY SWITCHING CIRCUIT

Franklin E. Taylor, Buffalo, N.Y., assignor, by mesne assignments, to Sylvania Electric Products, Inc., Wilmington, Del., a corporation of Delaware Filed Nov. 30, 1956, Ser. No. 625,410

7 Claims. (Cl. 250—20)

The present invention relates to radio receivers, more particularly to radio receivers of the type including a signal seeking tuner for semi-automatically scanning a band of frequencies until a signal of sufficient strength for suitable reproduction is received, at which time the scanning is terminated and the receiver is accurately tuned to said received signal. The invention has for a particular object the provision of a new and improved high quality signal seeking receiver which may be energized from an automobile battery.

Although signal seeking receivers have heretofore been manufactured and sold for a number of years, finding particular application in automobiles, such receivers leave much to be desired in the way of accuracy of tuning, reliability and quality of operation, compactness in physical size, economy of manufacture, and for various other reasons.

Another object of the present invention, is therefore, to provide a new and improved signal seeking receiver wherein one or more of the above disadvantages of prior art receivers is avoided.

Another object of the present invention is to provide a new and improved signal seeking tuner having the advantages of simplicity in design and use and reliability in operation.

Another object of the present invention is to provide a new and improved audio squelch circuit for a radio receiver.

Another object of the present invention is to provide a new and improved audio squelch circuit for use in a signal seeking receiver.

Still another object of the present invention is to provide a new and improved audio squelch circuit which renders the audio circuits of a radio receiver inoperative during automatic scanning of the frequency spectrum.

A further object of the present invention is to provide a new and improved intelligence circuit for providing a signal indicative of the presence of a received signal of at least a predetermined amplitude.

A further object of the present invention is to provide a new and improved intelligence circuit which effects a signal of predetermined magnitude at a fixed frequency distance from a received carrier wave irrespective of wide variation in the signal strength of the received wave.

A further object of the present invention is to provide a new and improved intelligence circuit which can be incorporated into a radio receiver without the use of additional tubes.

A further object of the present invention is to provide a new and improved trigger circuit for controlling a relay.

A still further object of the present invention is to provide a new and improved trigger circuit for controlling a relay which interrupts the scanning action of a signal seeking tuner when the tuner is tuned to a signal of at least a predetermined strength.

Another object of the present invention is to provide a new and improved control circuit which is both simple and reliable and which provides high accuracy of control irrespective of large changes in the voltage of the energizing source of energy.

Another object of the present invention is to provide a new and improved signal seeking tuner providing scanning of the frequency spectrum in both directions.

Still another object of the present invention is to provide a new and improved signal seeking tuner whereby two-way scanning of the frequency spectrum is achieved in a simple and inexpensive manner.

Still another object of the present invention is to provide a new and improved signal seeking tuner employing a motor driven, clutch stopping type scanning control.

Briefly, in accordance with the present invention, provision is made of a signal seeking receiver having an intelligence circuit which utilizes the primary and secondary voltages from a conventional second I.F. transformer of a standard broadcast receiver in such a manner that a signal voltage is provided which has a predetermined value at a fixed frequency distance from the received carrier wave irrespective of the signal strength of that wave; of an audio squelch circuit in which a negative D.C. voltage, which is developed in the standard broadcast receiver oscillator, is employed to cut off the audio amplifier during the signal seeking operation; of a novel trigger circuit for energizing a control relay in response to a signal from the intelligence circuit and which includes a pair of amplifying tubes connected in a novel manner so that wide variation in the energizing voltage therefor does not affect the operation of a control relay; and a scanning motor control circuit whereby two-way scanning is achieved in an inexpensive and reliable manner by the use of a center tapped solenoid of a stopping clutch to provide a source of opposite polarity voltages for energizing the scan motor.

For further objects and advantages and for a better understanding of the present invention attention is now directed to the following detailed description taken in connection with the drawings in which:

Fig. 1 is a schematic illustration of a broadcast receiver embodying the present invention;

Figs. 2(*a*) to 2(*d*) comprise a series of waveforms useful in understanding the operation of the circuit of Fig. 1;

Figure 1:
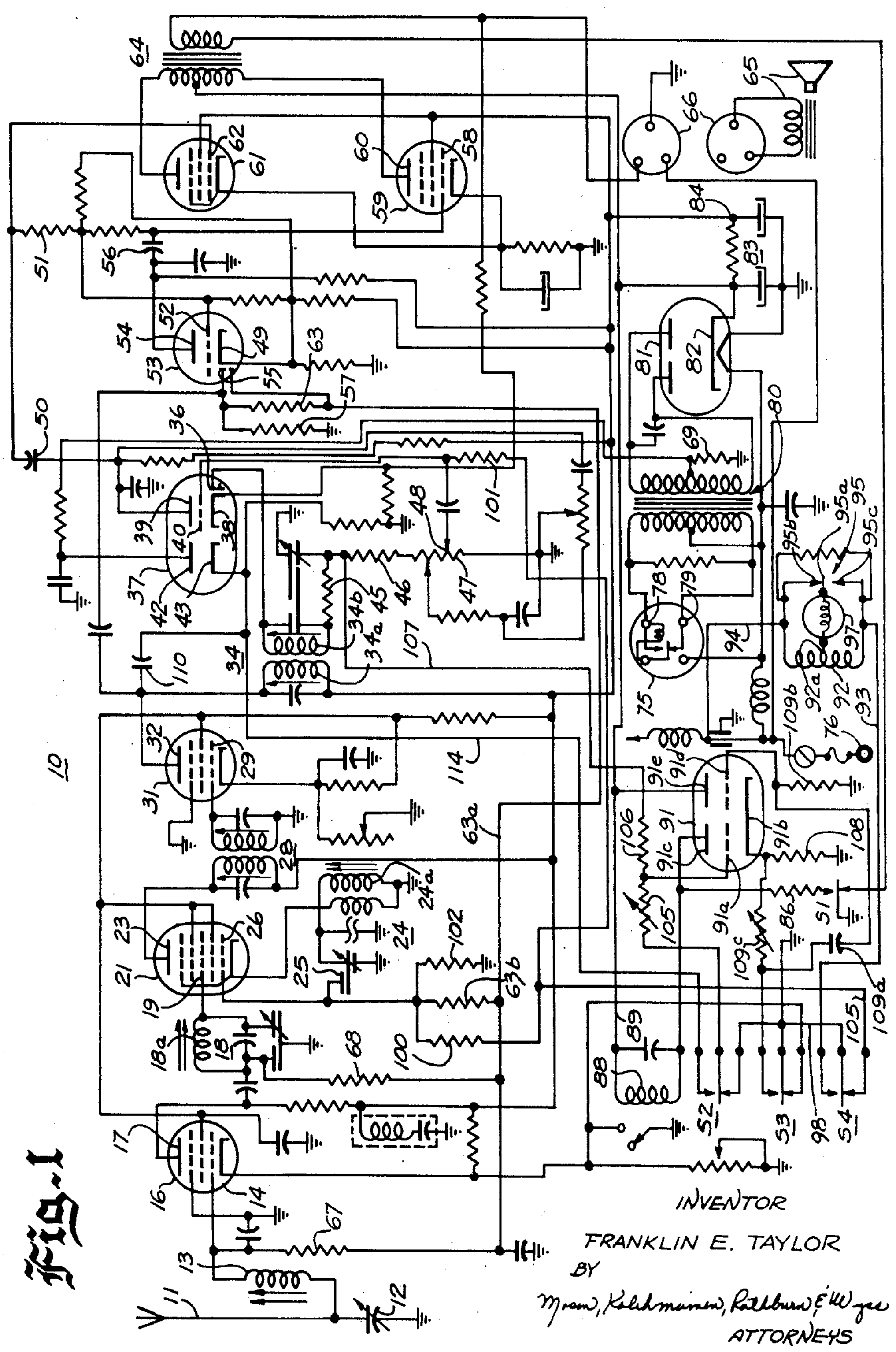

Referring now to the drawings and, more particularly, to Fig. 1 thereof, there is shown a signal seeking receiver 10 consisting of a conventional AM broadcast receiver incorporating a signal seeking tuner which, in response to the actuation of a switch, seeks out a broadcast signal of at least a predetermined signal strength and automatically tunes the receiver to that signal without any additional manipulation of the controls by the operator.

The standard broadcast receiver portion of the receiver 10 includes an antenna 11 which responds to various transmitted signals to develop across the variable capacitor 12 voltages representative of the various waves intercepted by the antenna 11. The variable capacitor 12 is part of an adjustable resonant circuit which includes the permeability tuned inductor 13 whereby the selectivity of the antenna system may be adjusted to couple to the control grid 14 of an R.F. amplifier 16 only that signal lying within the pass band of the tuned circuit. The signal provided on the grid 14 is amplified in the amplifier 16 and appears at the anode 17 thereof from which it is coupled through the adjustably tuned tank circuit 18 including the permeability tuned inductor 18*a* to the signal input grid 19 of the mixer 21.

In order to produce the desired intermediate frequency signal at the anode 23 of the mixer 21, a modified Hartley oscillator 24 is provided, which generates a high frequency voltage, the frequency of oscillation being adjustable by means of the variable inductor 24a. The high frequency voltage developed by the oscillator 24 is coupled through the capacitor 25 to the oscillator input grid 26 of the mixer 21 wherein the locally developed high frequency wave is heterodyned with the signal wave developed at the grid 19 to establish at the anode 23 a signal having the same modulation components as the wave supplied to the signal input grid 19, but having a carrier of a considerably reduced frequency.

The intermediate frequency signal which is developed at the anode 23, is coupled through a conventional I.F. transformer 28 to a control grid 29 of an I.F. amplifier 31 so as to develop at the plate 32 thereof an amplified I.F. signal which is in turn coupled through a second I.F. transformer 34 to an anode 36 of the tube 37. The tube 37 includes a diode section including the anode 36 and a cathode 38; a triode section including an anode 39, an associated control grid 40 and the cathode 38; and a second diode section including an anode 42 and a cathode 43. The signal which is developed across the output of the I.F. transformer 34 is detected by the diode comprising the plate 36 and the cathode 38 so as to develop a voltage varying at the frequency of the modulation components of the wave appearing across the series connection of the resistors 45, 46 and the potentiometer 47, the potentiometer 47 having a variable tap 48 thereon from which is coupled a portion of the voltage developed between the anode 36 and ground. Since the modulation components of the I.F. signal make up the audio signal, the potentiometer 48 is a conventional volume control type, the adjustment of which controls the magnitude of the audio voltage coupled to the grid 40. The audio signal so coupled to the grid 40 is amplified and coupled from the plate 39 to a push-pull amplifier consisting of the pentodes 59 and 61. A portion of the signal appearing at the plate 39 is coupled through capacitor 50 and the resistor 51 to the control grid 52 of an inverter tube 53, the output of which appears at the plate 54 thereof and is coupled through a capacitor 56 to the control grid 58 of the tube 59 having an anode 60. The output of the triode section of the tube 37 is also coupled to the control grid 62 of the pentode 61. The push-pull audio output of the amplifiers 59 and 61 is coupled through an audio output transformer 64 to a loud-speaker 65. As shown, a connector 66 is interposed between the speaker 65 and the output transformer 64 so as to permit disconnection of the speaker 65 from the receiver chassis thereby to facilitate manufacturing and repair of the receiver 10.

The inverter tube 53 includes at least a second anode 55 to provide an A.V.C. diode section between the cathode 49 and the anode 55. A portion of the signal voltage appearing at the anode 32 of the first I.F. amplifier 31 is coupled to the plate 55 for rectification in the diode section of the device 53, thereby to provide across its load resistor 57 a negative voltage which has a magnitude dependent upon the signal strength of the received wave. This negative voltage is connected through the resistor 63, the conductor 63a and the resistors 67 and 68 to the control grid of the R.F. amplifier 16 and the signal grid of the mixer 21 respectively. There is thus provided a negative bias voltage between the cathode and control grid of R.F. amplifier 16 and the cathode and signal grid of mixer tube 21 which tends to maintain the output of these tubes constant irrespective of fluctuations in the amplitude of the received signal.

In order to derive the required relatively high D.C. voltage for energizing the various tubes in the receiver from an automobile battery, there is provided a conventional vibrator 75 which is connected to be energized from the automobile "A" battery through a suitable terminal 76. The vibrator 75 provides an alternating current output between the terminals 78 and 79 which is stepped up in the transformer 80 and rectified in the double diode discharge device 81 to develop at the cathode 82 thereof a D.C. voltage of the required magnitude to energize the discharge devices in the receiver 10. This D.C. voltage is smoothed out in a conventional filter 83 to provide at the terminal 84 a D.C. voltage having a small ripple component. The center tap of the secondary winding of the transformer 80 is grounded through a resistor 69, the value of which controls the energization voltage of the diode section of the discharge device 37.

The circuits and operation of the receiver thus far described are standard for automobile broadcast receivers and no further discussion is necessary. It should be pointed out, however, that this circuit is entirely conventional in that no additional tubes or other circuit elements have been included in those portions of the receiver 10 which have thus far been described.

Before considering in detail the various aspects of the present invention which are embodied in the signal seeking portion of the receiver 10, for purposes of facilitating an understanding of the invention, the over-all operation of the tuner will be described. Therefore, let it be assumed that the receiver is energized and the cores of the inductors 13, 18a and 24a, which are ganged together in conventional manner are so positioned that the receiver is tuned so as to select and reproduce some particular signal in the broadcast band. When it is desired to tune the signal of another station operating at a different frequency, a scan control switch S–1 (lower left in Fig. 1) is momentarily actuated so as to connect the lower end of the resistor 86 to ground. The winding of the control relay 88 is thus connected directly between ground and the cathode 82 of the double diode 81 through the conductor 89 and the resistor 86 and, consequently, is energized, thereby to pick up the shunt arms of contact sections S–2, S–3 and S–4 of the relay 88. Prior to the time the switch S–1 is closed the relay 88 is deenergized because both triode sections of the trigger tube 91 are normally maintained in an essentially nonconductive condition independently of signals received by the receiver.

When the relay 88 is thus energized, the lower end of the coil 92 is connected through a series circuit including the conductor 93, the contact section S–4 and the conductor 98 to ground, and since the upper end of the coil 92 is connected through the conductor 94 to the battery terminal 76, a voltage having approximately the magnitude of the "A" battery voltage is developed across the coil 92. A limit switch 95 is provided which has the common contact terminal 95a thereof connected to one terminal of a single phase reversible D.C. motor 97 and which has the selectively connected contact terminals 95b and 95c connected to respective ends of the coil 92. The other terminal of the motor 97 is connected directly to a center tap 92a on the coil 92. It may thus be seen that the position of the common contact members 95a of the limit switch 95 is determinative of the polarity of the voltage connected to energize the motor 97 and, therefore, is determinative of the direction of rotation thereof. The inductors 13, 18a and 24a, which are ganged together, are adapted to be simultaneously adjusted by rotation of the motor 97, thereby to sweep the broadcast band in a direction dependent upon the direction of rotation of the motor 97.

Unless the audio circuits are rendered inopertaive during scanning, unpleasant sounds are produced by the loud-speaker 65 as signals of insufficient strength to stop the tuner are encountered. To eliminate these unpleasant sounds there is provided an audio squelch circuit which comprises a resistor 100 connected between the oscillator input grid 26 of the mixer 21 and ground through the normally closed contacts of the section S–4 of the relay 88. A grid resistor 101 of the amplifier tube 37 is also connected to the same normally closed contacts of the relay section S–4. When, therefore, the receiver is in normal operation and the relay 88 is deenergized the lower ends of the resistors 100 and 101 are grounded and the grid 26 is decoupled from the input grid 40 of the audio amplifier. When, however, the relay 88 is energized and the motor 97 produces scanning of the broadcast band, the lower end of the resistor 100 is coupled to the lower end of the resistor 101 thereby to couple the negative voltage, which is developed by the oscillator 24 across the resistor 102, to the grid 39 so that the triode section of the tube 37 is biased beyond cutoff to silence the loud-speaker 65. Since relay 88 is energized only during scanning, the necessary audio-squelching is thus provided in an inexpensive and reliable manner.

At the time the switch S–1 is closed and the relay 88 is energized, the triode sections of the device 91 become conductive and remain conductive in a manner to be described hereinafter until a negative voltage sufficient to cut off the left-hand triode section of the device 91 is supplied to the grid 91*a* thereof, at which time the relay 88 is deenergized thereby to drop out the shunting members of the sections S–2, S–3, and S–4. The coil 92 is thus disconnected from across the "A" battery and the scanning or signal seeking operation is interrupted.

In order to provide an intelligence circuit suitable for supplying a signal of at least the cut-off level to the grid 91*a* when a signal of at least a predetermined magnitude is selectively coupled to the receiver from the antenna 11, a pair of opposite polarity signals are derived from the primary and secondary windings 34*a* and 34*b*, respectively, of the second I.F. transformer 34 and are coupled through the resistors 105 and 106 to be superimposed on the grid 91*a*. The resistance value of the resistor 105 is adjustable so as to enable adjustment of the tuning sensitivity of the automatic scanning circuits. As the carrier frequency of a received signal of sufficient strength for satisfactory reproduction is approached during scanning of the broadcast band, the voltage at the grid 91*a* becomes progressively more negative until the device 91 is cut off, thereby deenergizing the relay 88. This cut-off voltage appears at a fixed frequency distance from the carrier frequency of the signal being tuned in irrespective of the strength of that signal provided its strength is at least of a predetermined magnitude. This predetermined magnitude is originally selected by the proper choice of parameter values for resistors 106 and 69 and adjustment of resistor 105. In this connection it will be understood that an inherent time delay occurs between the time that the motor 97 is deenergized and the time at which the movable elements of the variable tuning devices, which in the present embodiment of the invention are permeability tuned inductors, come to rest. In the past, various techniques have been employed to avoid the deleterious effects of this time delay which is generally associated principally with the inertia of the rotor of the motor 97 and to lesser extent with the inertia of the movable elements of the variable tuning devices. In accordance with some of these techniques attempts have been made to construct motors having very little inertia so that stopping is effected in a minimum of time. Such motors are, however, expensive and it is desirable that means be provided for using a conventional inexpensive type motor for tuning purposes. Also, circuits have been proposed which cause the scanning motor 97 to operate at two different speeds, a fast speed at frequencies widely separated from strong signals and a slow speed in the immediate vicinity of strong signals. This expedient has, however, also resulted in an overly expensive type control arrangement thereby prohibiting its commercial success.

In the receiver 10 of the present invention this inherent time delay is maintained constant by the provision of a solenoid operated clutch and brake unit 94*a*, described in more detail hereinafter in connection with Fig. 3, which is interconnected between the shaft of the motor 97 and the adjustably positioned cores of the inductors 13, 18*a* and 24*a* so that deenergization of the solenoid 88 results in the rapid termination of the movement of the cores of the inductors 13, 18*a* and 24*a* a fixed time thereafter. The brake enables the use of an inexpensive motor having a high inertia rotor to drive the cores so as to scan the broadcast band, and since the scanning ceases at a fixed time after deenergization of the solenoid 88, the intelligence circuit of the present invention is accordingly designed to develop the desired triggering voltage at the grid 91*a* at a fixed frequency distance from and ahead of the signal carrier frequency as the broadcast band is scanned. As a result, the tuner is accurately adjusted for reception of the carrier frequency, whereby maximum quality and efficiency of operation of the receiver portion of the signal seeking receiver 10 is achieved.

In order to develop at the grid 91*a* a triggering voltage of predetermined magnitude at a fixed frequency distance from the carrier wave of a received reproducible signal irrespective of the signal strength thereof, the signal which appears across the primary winding 34*a* of the second I.F. transformer 34 is coupled through the capacitor 110 to the cathode 43 of the device 37 for rectification therein. There is thus developed a voltage of positive polarity at the cathode 43 which is coupled through the conductor 114, the contacts S–2 of the relay 88 and the resistor 105 to the control grid 91*a*. The negative voltage which is developed across the resistor 46 and the potentiometer 47 by the rectifier 36, 38 is coupled through the conductor 107 and the resistor 106 to the control electrode 91*a*. It may thus be seen that the junction between the resistors 105 and 106 is provided with a D.C. voltage having a polarity and magnitude (with respect to ground) which are determined by the two signals of opposite polarity which are supplied thereto from the primary and secondary windings of the transformer 34.

Figures 2, 3, 4, 5:
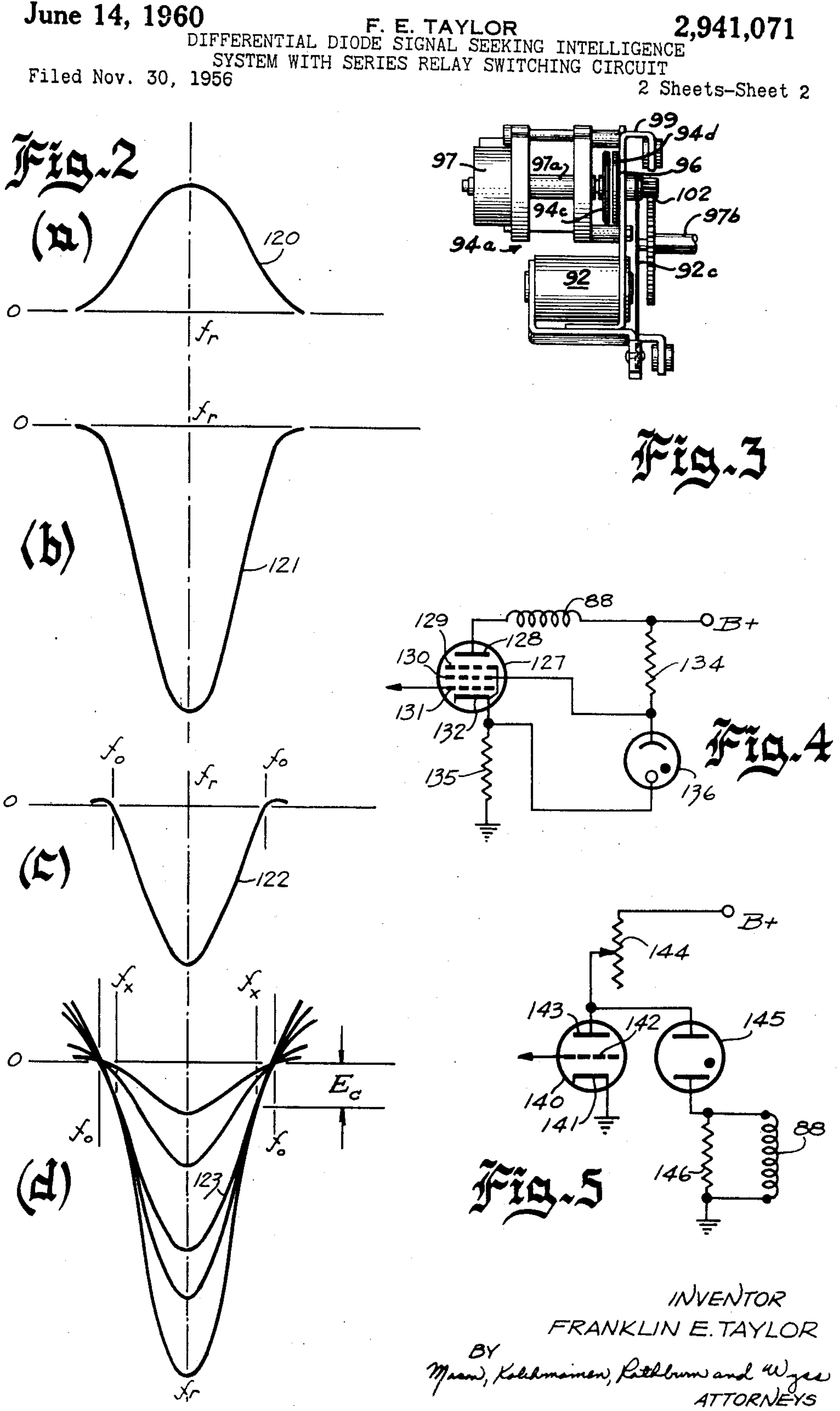
Fig. 3 is a side elevation view of the tuner drive motor and clutch of the present invention.
Fig. 4 is an alternative embodiment of one aspect of the present invention.
Fig. 5 is another alternative embodiment of that aspect of the invention shown in Fig. 4.

For a better understanding of the operation and advantages of the intelligence circuit of the present invention, attention is directed to the waveforms of Fig. 2 which conform to the voltages appearing at various points in the intelligence circuit when the carrier frequency of a received signal suitable for reproduction is approached by the progressive tuning of the tuned circuits in the R.F. amplifier and oscillator sections of the receiver. Curve 120 in Fig. 2*a* shows the waveform of the voltage which is developed at the cathode 43 of the discharge device 37. It will be noted that the waveform 120, which is also representative of the frequency selectivity characteristic of the tuned circuit which includes the primary winding 34*a*, is symmetrical with respect to the resonant frequency of the primary winding 34*a*, this frequency being designated as $f_r$ in the drawings. Therefore, as the I.F. frequency of the selected signal approaches the resonant frequency of the I.F. transformer 34 the voltage at the cathode 43 increases in a positive direction toward a maximum value which occurs at the resonant frequency, $f_r$, of the transformer 34.

Curve 121 in Fig. 2*b* is the waveform of the voltage developed at the anode 36 of the tube 37. Since the second I.F. transformer 34 is of the double-tuned type, that is, both the primary and secondary windings are tuned, the secondary winding is conventionally made more selective than the primary winding as evidenced by the sharper frequency response characteristic thereof. It will be seen, therefore, that as the frequency of the I.F. signal approaches the resonant frequency of the second I.F. transformer 34, the voltage appearing at the cathode 43 approaches a maximum positive value at $f_r$ whereas the voltage appearing at the anode 36 approaches a maximum negative value at this same frequency. The points in the circuit at which the waveforms 120 and 121 appear are respectively coupled through the resistors 105 and 106 to the control grid 91*a* of the left-hand triode section of the discharge device 91. By a proper selection of the circuit parameters, the waveform 122 shown in Fig. 2*c* is developed at the control grid 91*a*. It may thus be seen that as the resonant frequency of the primary winding of the I.F. transformer 34 is approached, the voltage at the control grid 91*a* first gradually increases to a relatively small positive value and then decreases to zero, this point being designated in Fig. 2(*c*) as $f_o$, the cross-over frequency, and continues to decrease to a maximum negative value at the frequency $f_r$. Because of the fact that the waveforms 120 and 121 which combine to produce the waveform 122 are each symmetrical with respect to the frequency $f_r$, the composite waveform 122 is also symmetrical with respect to the frequency $f_r$. Consequently, the cross-over frequencies, $f_o$, are equally spaced on opposite sides of the resonant frequency.

Referring to Fig. 2(*d*), there is shown a family of curves representative of the waveforms appearing at the control grid 91*a* for received signals of different strengths. The cross-over frequencies $f_o$ of each of these curves is the same and it will be observed that all of the curves having a strength greater than that represented by the curve 123 are substantially coincident at the frequencies $f_x$, which, of course, are equally spaced on opposite sides of the frequency $f_r$. If, therefore, the received signal selected from the antenna 11 is above a predetermined value, i.e., that represented by the curve 123, the voltage at the control grid 91*a* will increase as the resonant frequency of the second I.F. transformer 34 is approached, toward a negative maximum value at the frequency $f_r$ and will attain a voltage of E*c*, the cut-off voltage of the left-hand section of the discharge triode device 91, at a frequency $f_x$. Therefore, as long as the input signal is above this predetermined strength, a voltage of cut-off magnitude for the left-hand triode section of the device 91 will be supplied to the control grid 91 at a fixed frequency distance from the resonant frequency of the I.F. transformer 34. As heretofore indicated, by proper adjustment of the value of the resistors 105, 106 and 69, curve 123 represents a signal of minimum strength which will provide good audio reproduction by the loudspeaker 65.

Having thus provided a triggering signal from the above described intelligence circuit which cuts off the left-hand triode section of the discharge device 91 at a fixed frequency distance from the frequency $f_r$, it will be apparent that the discharge device 91 is cut off when the tuner section of the receiver is tuned to a frequency which is also at a fixed distance from the transmitted carrier irrespective of the signal strength of the received wave as long as it is above a predetermined value. It thus only becomes necessary to stop the tuning adjustment at a fixed time period after the cut-off of the discharge device 91. At that time the tuner is exactly tuned to the transmitted carrier frequency, and, therefore, the I.F. carrier frequency is exactly equal to the center frequency of the I.F. stages of the receiver 10. Since by simply making the proper selection of the circuit parameters in the intelligence circuit, the frequencies $f_x$ may be so positioned that the inherent time delay results in the tuner being exactly tuned to the resonant frequency, a standard motor 97 and clutch 94*a* may be utilized in the receiver 10. High accuracy in tuning of the receiver 10 is thus achieved without the use of expensive scanning apparatus. An additional important advantage of the intelligence circuit of the present invention is that the output waveforms of the primary and secondary windings of the I.F. transformer 34 are to some extent balanced out one against the other such that any noise appearing in the receiver signal wave is also effectively balanced out so as to minimize its effect on the control of the discharge device 91 to cut it off at an incorrect frequency. High accuracy of tuning is thus effected even when there is a considerable amount of noise in the received signal such as when the receiver 10 is in the vicinity of neon lights or high voltage transmission lines.

As heretofore discussed, it is desirable that the scanning of the broadcast band be performed as rapidly as possible and, consequently, it is desirable that the motor 97 operate at a relatively high speed. It is also desirable, however, that the slope of the response curve 122 of the intelligence circuit portion of the receiver 10 be as steep as possible so that the cut-off voltage of the left-hand triode section of the device 91 will be approached as rapidly as possible to insure cut-off of the left-hand triode section of the device 91 exactly at the frequency $f_x$. As is well known by those skilled in the art, there is a time delay between the time the scanning motor 97 is deenergized and the time at which the output shaft thereof comes to rest. If the output shaft of the motor 97 were connected directly to the tuning elements of the inductors in the tuner of the receiver 10, the motor would coast after it is deenergized in response to the triggering signal and would overshoot the desired center frequency $f_r$. On the other hand, a frequency response curve having a steep slope is desirable from the standpoint of selectivity but such a response curve has only a relatively small frequency difference between the frequency $f_x$ and the frequency $f_r$, so that only a very short time interval is available for the motor to come to rest. In addition, it is desirable that the motor 97 rotate at a relatively high speed so that rapid scanning of the broadcast band is achieved, but such an arrangement increases the coasting time of the motor 97. Therefore, the provision of the combined clutch and brake unit 94*a* has resolved these conflicting requirements by enabling rapid tuning and both accurate and rapid stopping. The clutch and brake unit 94*a* which is provided in the receiver 10 of the present invention comprises a clutch portion which when energized couples torque from the motor 97 to the tuning mechanism of the receiver 10, and a brake portion which is actuated when the clutch portion is deenergized rapidly to stop the movement of the tuning shaft of the receiver 10. It may thus be seen that when a stop signal is transmitted to the clutch and brake unit 94*a*, rapid termination of the scanning of the frequency spectrum takes place.

In accordance with one aspect of the present invention, the clutch and brake unit 94*a* is solenoid actuated such that when the solenoid thereof is provided with energization current the clutch is thrown in so as to couple torque from the drive motor 97 to the tuning shaft of the receiver. Moreover, the solenoid of the unit 94*a* is center tapped and used for providing the opposite polarity voltages for energizing the motor 97. Therefore, the coil 92 shown in Fig. 1 for providing the opposite polarity voltages for the motor 97 is the winding of the solenoid used for actuating the clutch and brake unit 94*a*. It will be seen that by utilizing the solenoid winding of the unit 94*a* in this manner certain components are eliminated from the receiver, thereby reducing the manufacturing cost thereof, and simultaneous deenergization of both the motor 97 and the clutch and brake unit 94*a* are insured.

Referring to Fig. 3 wherein is shown the structural configuration fo the clutch and brake unit 94*a*, it may be seen that the unit 94*a* generally comprises a solenoid 92 and the drive motor 97 which are suitably mounted on a support frame 99. The motor 97 is provided with an output shaft 97*a* to the end of which is connected a drive clutch plate 94*c* which is fixedly positioned in an axial direction opposite a driven clutch plate 94*d* which is movable in an axial direction into and out of engagement with the clutch plate 94*c*. Conveniently, the movable clutch plate 94*d* may be supported in a suitable aperture in the frame 99. The opposing faces of the clutch plates 94*c* and 94*d* are of the friction type, thereby to enable very fine and accurate adjustment of the tuning shaft of the receiver 10, and the rear face 96 of the movable clutch plate 94*d* is provided with a friction surface for engagement with the frame 99 when the solenoid 92 is deenergized. To this end, the solenoid 92 is provided with a leaf spring type armature 92*c* which is fixedly attached at its lower end to the frame 99 and attached in a suitable annular recess in the shaft of the movable clutch plate mechanism 94*d* so that when the solenoid 92 is energized, the clutch plate 94*d* is moved into engagement with the driving clutch 94*c*, and when the solenoid 92 is deenergized the self-biasing action of the leaf spring armature 92*c* urges the rear face 96 of the movable clutch plate 94*d* into engagement with the frame 99 thereby quickly to stop rotation thereof. Therefore, the face 96 is provided with a rubber or suitable friction face. Suitable gearing 102 is provided for coupling the output torque from the clutch plate 94*d* to the output shaft 97*b*, which may conveniently be the tuning shaft of the receiver 10. Although the particular structure of the clutch and brake shown in Fig. 3 does not constitute a part of the present invention, it was employed in a reduction to practice of the invention and found to operate satisfactorily. By utilizing this configuration, however, the use of a center tapped solenoid winding for both actuating the clutch and brake unit and for providing oppositely polarized voltages for the energization of the drive motor 97 is enabled and, in addition, a fixed time delay between the deenergization of the solenoid 92 and stopping of the shaft 97*b* is obtained in an economical and reliable manner.

In order to provide two-way scanning of the broadcast band, the energizing terminals of the motor 97 are adapted to be selectively connected across different portions of the solenoid coil 92 by means of the limit switch 95 in the manner heretofore described in connection with Fig. 1. Accordingly, the motor 97 may be rotated in either direction depending upon the position of the limit switch 95. The polarity of the energizing voltage supplied across the terminals of the motor 97 is thus reversible to provide corresponding reversibility of the motor 97. Since it is necessary to deenergize the solenoid of the clutch as well as the scanning motor 97, when the discharge device 91 is non-conductive the solenoid winding 92 of the solenoid operated clutch may conveniently be used for providing the voltage of opposite polarity for selective coupling across the energization terminals of the motor. Therefore, an expensive split resistor or inductor which otherwise would be necessary to provide these voltages of opposite polarity is eliminated from the receiver 10 thereby reducing the manufacturing cost thereof. Furthermore, with the inclusion of the clutch 94 in the scanning control system, an inexpensive reversible D.C. motor may be used since the coasting time of the motor 97 after the motor has been deenergized does not affect the tuning after the shaft 97*a* is disconnected from the tuner shaft 97*b* at the time the solenoid 92 is deenergized.

Preferably, the motor 97 is of the constant speed type so that the shaft 97*b* is also rotated at a constant speed. Accordingly, the shaft 97*b* will come to a stop at a fixed time after the clutch 94 is thrown out. By loading the shaft 97*b* so that it operates into a relatively high friction load when the motor 97 is deenergized, the stopping time of the shaft 97*b* is made relatively small, and the frequency $f_x$ is adjusted as heretofore described so that the frequency difference between the frequency $f_x$ and frequency $f_r$ corresponds to the travel of the tuning elements in the inductors 13, 18*a* and 24*a* after the clutch 94 is thrown out. Therefore, since the discharge device 91 is cut off at exactly the frequency of $f_x$ in a manner hereinbefore described, the tuner will come to rest so that it is tuned to the exact carrier frequency of the received signal which caused the cut-off of the device 91. In consequence thereof the receiver 10 is tuned so that it operates at its maximum efficiency to provide a signal of the highest quality commensurate with the design of the receiver portion thereof.

When a signal seeking receiver is used in an automobile and is energized from the "A" battery thereof some means must be provided for accurately stopping the tuner irrespective of wide variations in the energization voltage for the receiver and the control circuits. For example, in the case of a 6-volt automobile battery the output voltage therefrom varies between 5.5 and 8 volts which results in a proportionate change in the B+ voltage. Although voltage regulators could be used so as to provide a relatively constant energizing voltage for the receiver and control circuits, such regulators are relatively expensive, and, if possible, their use should be avoided.

In accordance with the present invention the trigger signal supplied to the electrode 91*a* of the discharge device 91, which does not vary appreciably with changes in the supply voltage, is employed to deenergize the relay 88 so that such deenergization is independent of fluctuations in the voltage level of the B+ supply. More particularly, the common cathode of the device 91 is connected to ground through a resistor 108 which has a relatively high resistance value. The common cathode resistor 108 thus tends to bias the device 91 toward cut-off so that only a relatively small amount of current flows in the right-hand triode section and no current flows in the left-hand section of the device 91 during non-scanning periods. When, however, the scan switch S–1 is actuated so as to energize the winding of the relay 88, the normally open contact section S–3 is closed thereby to connect the resistor 109*c* which has a relatively low resistance value in parallel with the common cathode resistor 108, and thus permit heavy conduction in both triode sections of the device 91. These sections remain conductive until the negative trigger voltage which is supplied to the electrode 91*a* reaches cut-off level at which time the left-hand triode section of the device 91 is cut off so that the relay 88 is deenergized and the high resistance cathode resistor 108 is unshunted so as to restore the above described current conditions in the two sections of the device 91.

Considering now the operation of the trigger circuit of the present invention when the B+ voltage fluctuates due to fluctuations in the voltage of the "A" battery, since the plate 91*e* of the right-hand triode section of the device 91 is connected directly to the cathode 82 of the rectifier 81, and since the plate 91*c* of the left-hand triode section is connected to the cathode 82 through the relay winding 88, changes in the voltage appearing at the cathode 82 cause a greater corresponding change in the conduction current in the right-hand triode section than in the left-hand triode section of the device 91. Assuming, for example, that the B+ voltage appearing at the cathode 82 appreciably increases in a positive direction, the voltage appearing between the anode 91*e* and the cathode 91*b* appreciably increases and the current in the cathode resistors 108 and 109*c* and thus the voltage drop thereacross appreciably increases. In consequence thereof the cathode 91*b* rides at an increased positive level. This increase in positive voltage at the cathode 91*b* offsets the increase in the voltage at the anode 91*c* which occurs when the voltage of the cathode 82 is increased. As a result, the voltage drop across the anode-cathode circuit of the left-hand triode section of the device 91 remains relatively constant and the conduction current therein also remains constant. Since the conduction current in the left-hand triode section of the device 91 holds the relay 88 picked up, the holding current for the relay 88 remains constant irrespective of variations in the B+ voltage which appears at the cathode 82.

With the receiver 10 tuned to a signal of sufficient strength to cause the tuner to lock thereon, it is frequently desirable automatically to tune the receiver to another signal by the momentary actuation of the scan switch S–1. Therefore, in order to prevent the negative triggering signal from the intelligence circuit, which is coupled to the grid 91*a*, from immediately cutting off the left-hand triode section of the device 91 when the scan switch S–1 is released, there is provided a time delay circuit which momentarily increases the energizing voltage for the anode-to-cathode circuits of both sections of the discharge device 91 when the switch S–1 is actuated. Therefore, the motor 97 is locked in an energized condition for a sufficient time to cause the tuner to move away from the previously received signal such that the triggering voltage developed at the grid 91*a* by the previous station signal is insufficient to cut off the left-hand triode section of the device 91.

It is, however, important that the control circuit be returned to its normal condition as soon as possible so that closely adjacent signals may be automatically tuned in. Therefore, there is provided a time delay circuit including a capacitor 109*a* connected in series with a resistor 109*b* between the normally open contact of the relay section S–3 and ground. The control electrode 91*d* of the right-hand triode section of the discharge device 91 is directly coupled to the junction of the capacitor 109*a* and the resistor 109*b*. It may thus be seen that during the time that the left-hand triode section of the discharge device 91 is maintained cutoff by the negative triggering voltage and subsequently by the high voltage developed across the common cathode resistor 108, the capacitor 109*a* is charged to the voltage which is developed across the cathode resistor 108. When the relay 88 is initially picked up and the normally open contact of the section S–3 is closed thereby connecting the junction of the capacitor 109*a* and the resistor 109*c* to ground through the contact section S–3, the capacitor 109*a* discharges to ground through the resistor 109*b* thereby developing a high negative voltage thereacross which is coupled to the control grid 91*d*. This negative voltage on the control electrode 91*d* greatly reduces the conduction current in the right-hand triode section of the discharge device 91 thereby greatly decreasing the voltage drop across the cathode resistors 108 and 109*c*, thereby to increase the anode-to-cathode energization voltage appearing across the left-hand triode section of the discharge device 91. As a result, the negative voltage which is developed by the intelligence circuit and supplied to the grid 91*a* is insufficient to cut off the current in the left-hand triode section of the device 91 and the relay 88 remains picked up to effect scanning of the broadcast band away from the previously received signal. Once the capacitor 109*a* has discharged the control circuit including the discharge device 91 is returned to its normal condition and operates in the manner heretofore described. A proper selection of the values of the capacitor 109*a* and the resistor 109*b* provides a time constant of sufficient value that the control circuit is returned to its normal operating condition at a very short time after the frequency $f_x$ of the previously selected signal is passed in the scanning operation. Therefore, signals which are closely adjacent to one another in the broadcast band may be tuned in.

Referring now to Fig. 4 wherein is shown an alternative embodiment of the trigger circuit shown in Fig. 1, a pentode 127 having an anode 128, a suppressor grid 129, a screen grid 130, a control grid 131, and a cathode 132, is adapted to have the intelligence signal appearing at the junctions of the resistors 105 and 106 in Fig. 1 coupled to the control grid 131. The anode 128 is connected through the coil of the relay 88 to the source of B+ potential which may either be the cathode 82 of the rectifier 81 or the output terminal 84 of the filter 83. The suppressor grid 129 is connected to the cathode 132 and the screen grid 130 is connected through a resistor 134 to the B+ terminal. A cathode resistor 135 is connected between the cathode 132 and ground and a voltage regulator tube 136 is connected between the cathode 132 and the screen grid 130. The tube 136 functions to maintain the screen-to-cathode voltage of the pentode 127 constant irrespective of changes in the B+ voltage. As a result, the plate current of the pentode 127 is relatively constant irrespective of fluctuations in the B+ voltage, and consequently, the negative voltage required on the grid 131 to reduce the output current of the device 127 to below the drop-out current for the relay 88 remains constant. Since the trigger circuit of Fig. 4 requires the use of two tubes, a pentode and gas diode voltage regulator, the trigger circuit of Fig. 1 is less expensive and, consequently, for most applications is more desirable.

Referring to Fig. 5 there is shown an alternative embodiment of the trigger circuit shown in Fig. 4 which may be used to control the operation of the relay winding 88 in Fig. 1. This circuit comprises a triode discharge device 140 having a cathode 141, a control electrode 142 and an anode 143, the anode 143 being connected through a variable resistor 144 to the B+ source which, in Fig. 1, would be the cathode 82 of the rectifier 81. The triggering signal from the intelligence circuit, which appears at the junction of the resistors 105 and 106, is adapted to be coupled to the control electrode 142 and is thus used to control the conduction current between the cathode 141 and the anode 143. In order accurately to control the level of input voltage at which the relay winding 88 is dropped out, a gaseous glow tube 145 such, for example, as a neon glow tube NE2, is serially connected with the relay winding 88 between ground and the anode 143 and a resistor 146 is connected in parallel with the winding 88.

It thus may be seen, that the signal seeking tuner of the present invention as embodied in Fig. 1 may be incorporated into a standard automobile broadcast receiver by the addition of only one discharge device, that being the double triode 91. Although the diode comprising the plate 42 and the cathode 43 in the discharge device 37 is added to the standard receiver to provide the required positive intelligence waveform from the primary winding 34*a* of the second I.F. transformer 34, there are tubes presently available which have this additional diode in the same envelope as the triode and double diodes. Consequently, no additional tube need be added to the receiver. The tuning elements, that is, the variable inductors 13, 18*a* and 24*a* are standard permeability tuned inductors, so that they may be readily adapted to be controlled by means of the motor 97 working through the clutch 94.

The present invention thus provides a signal seeking receiver having high accuracy of tuning irrespective of changes in energizing voltage so that the receiver may be used in an automobile and energized by the automobile battery thereof. The circuit further provides good noise rejection to prevent the automatic tuning mechanism from tuning on noise rather than on signals suitable for reproduction by the loudspeaker 65.

It will be understood that various circuit arrangements and various circuit components may be employed in connection with the arrangement of the present invention. In order, however, to illustrate the relative magnitudes of the principal elements of a typical circuit arrangement which has been found satisfactory, the following approximate values of such elements, together with other pertinent information, are given for a particular device. It should be understood that these values are given by way of example only and not by way of limitation.

| | |
|---|---|
| Tube **16** | 6BD6 |
| Tube **21** | 6BE6 |
| Tube **31** | 6BD6 |
| Tube **37** | 6T8 |
| Tube **53** | 6AV6 |
| Tubes **59** and **61** | 6AQ5 |
| Tube **81** | 6X4 |
| Tube **91** | 6J6 |

| | | |
|---|---|---|
| Resistor 45 | ohms | 47,000 |
| Resistor 46 | do | 220,000 |
| Resistor 51 | do | 150,000 |
| Resistor 57 | megohms | 1 |
| Resistor 63 | do | 1 |
| Resistor 63B | do | 15 |
| Resistor 86 | ohms | 15,000 |
| Resistor 100 | do | 15,000 |
| Resistor 101 | do | 15,000 |
| Resistor 102 | kilohms | 47 |
| Resistor 105 | do | 220 |
| Resistor 106 | do | 220 |
| Resistor 108 | do | 330 |
| Resistor 109*b* | do | 220 |

| | Microfarads |
|---|---|
| Capacitor 110 | 10 |
| Capacitor 109A | .5 |
| Capacitor 50 | .022 |

While the invention has been described by particular embodiments thereof, it will be understood that those skilled in the art may make many changes and modifications therein without departing from the invention, and it is therefore intended to cover in the appended claims all such changes and modifications as fall within the true spirit and scope of the invention.

What is claimed as new and desired to be secured by Letters Patent of the United States is:

1. In a signal seeking receiver, tuning circuits, a motor for continuously changing the tuning of said tuning circuits, a relay for controlling the operation of said motor, a trigger circuit for controlling said relay, said trigger circuit comprising a first discharge device connected with the coil of said relay in the anode circuit thereof, a second discharge device, a common cathode resistor for said first and second discharge devices, means for energizing both of said discharge devices from the same source of potential, and means rendering the conduction current of said second discharge device more responsive than the conduction current of said first discharge device to changes in the potential of said source, whereby the current in said relay coil is substantially non-responsive to changes in the potential of said source; an intermediate frequency transformer, having tuned primary and secondary windings, in said receiver; a detector for producing a voltage of positive polarity connected to said primary winding; a detector for producing a voltage of negative polarity connected to said tuned secondary winding; means for combining said detected voltages to produce a control voltage; and means to apply said control voltage to a control electrode of said first mentioned electron discharge device.

2. In a signal seeking receiver, tuning circuits, a motor for continuously changing the tuning of said tuning circuits, a relay for controlling the operation of said motor, a trigger circuit for controlling said relay, comprising a first discharge device connected with the coil of said relay in the anode circuit thereof, a second discharge device, means for energizing said first discharge device from a source of potential, means for connecting the anode of said second discharge device directly to said source of potential, resistance means connected in the cathode circuit of said first discharge device, and means for coupling at least a portion of the conduction current of said second discharge device to said resistance means, whereby the current in said relay coil is substantially non-responsive to changes in the potential of said source; an intermediate frequency transformer, having tuned primary and secondary windings; a detector for producing a voltage of positive polarity connected to said primary winding; a detector for producing a voltage of negative polarity connected to said tuned secondary winding; means for combining said detected voltages to provide a control voltage; and means to apply said control voltage to a control electrode of said first mentioned discharge device.

3. In a signal seeking receiver, tuning circuits, a motor for continuously changing the tuning of said tuning circuits, a relay for controlling the operation of said motor, a trigger circuit for controlling said relay, comprising a first discharge device connected in series with a coil of said relay, a second discharge device, a common cathode resistor for said first and second discharge devices, means for energizing both of said discharge devices from the same source of potential, and means rendering the conduction current of said second discharge device more responsive than the conduction current of said first discharge device to changes in the potential of said source, whereby the current in said relay coil is substantially non-responsive to changes in the potential of said source; an intermediate frequency transformer having tuned primary and secondary windings; a detector for producing a voltage of positive polarity connected to said primary winding; a detector for producing a voltage of negative polarity connected to said tuned secondary winding; means for combining said detected voltages to provide a control voltage; and means to apply said control voltage to a control electrode of said first mentioned discharge device.

4. In a signal seeking receiver, a tunable circuit; a motor for continuously tuning said tunable circuit; a relay control circuit for controlling said motor, said relay control circuit, comprising a first discharge device having at least an anode and a cathode, means for connecting a relay in series with said first discharge device, a second discharge device having at least an anode, a cathode and a control electrode, an element having relatively high resistance connected between the cathodes of both of said devices and a point of reference potential, capacitor means adapted to be charged to the voltage drop across said element, and means connected to the control electrode of said second discharge device for utilizing the charge on said capacitor to momentarily decrease the conduction current in said second discharge device when said relay is initially energized; an intermediate frequency transformer; said transformer having tuned primary and secondary windings; a detector connected to said primary winding for producing a voltage of positive polarity; a detector connected to said secondary winding for producing a voltage of negative polarity; a resistive circuit, means for combining said produced voltages in said resistive circuit; and, a connection from said resistive circuit to a control electrode in said first mentioned discharge device for controlling the flow of current therethrough.

5. In a signal seeking receiver, a tunable circuit; a motor for continuously tuning said tunable circuit; a relay control circuit for controlling said motor, said relay control circuit, comprising a first discharge device having at least an anode, a cathode and a control electrode, means for connecting a relay in series with said first discharge device, a second discharge device having at least an anode, a cathode and a conduction current control electrode, said cathodes being connected together, a relative high resistant element connected between the cathodes of said devices and a point of reference potential, capacitor means adapted to be charged to the voltage drop across said element, and said capacitor being connected to the control electrode of said second discharge device to momentarily decrease the conduction current in said second discharge device when said relay is initially energized; an intermediate frequency transformer in said receiver, said transformer having tuned primary and secondary windings; a detector connected to said primary winding for producing a voltage of positive polarity; a detector connected to said secondary winding for producing a voltage of negative polarity; a resistive circuit, means for combining said voltages in said resistive circuit; and, a connection from said resistive circuit to a control electrode in said first mentioned discharge device for controlling the flow of current therethrough.

6. In a signal seeking receiver, a tunable circuit; a motor for continuously tuning said tunable circuit; a relay control circuit for controlling said motor; said relay control circuit, comprising a first discharge device having at least an anode, a cathode, and a control electrode, means for connecting a relay in series with said first discharge device, a second discharge device having at least an anode, a cathode and a control electrode, said cathodes being connected together, an element having a relatively high resistance connected between the cathodes of said devices and a point of reference potential, resistance means connected between said control electrode of said second discharge device and said point of reference potential, capacitor means adapted to be charged to the voltage drop across said element and switch means responsive to the energization of said relay connected to discharge said capacitor through said resistance means to momentarily decrease the conduction current in said second discharge device when said relay is initially energized; an intermediate frequency transformer in said receiver, said transformer having tuned primary and secondary windings; a detector connected to said primary winding for producing a voltage of positive polarity; a detector connected to said secondary winding for producing a voltage of negative polarity; a resistive circuit, means for combining said voltages in said resistive circuit; and, a connection from said resistive circuit to a control electrode in said first mentioned discharge device for controlling the flow of current therethrough.

7. In a signal seeking receiver, a motor for tuning the receiver over a desired range of carrier frequencies; an intermediate frequency transformer having a tuned primary winding and a tuned secondary winding; a first detector, detecting waves derived from the tuned primary winding; a second detector, detecting waves derived from the tuned secondary winding; a resistor; a connection for applying voltage of positive polarity, derived from the first detector connected to the primary winding, to one end of said resistor; a circuit for applying voltage of negative polarity, derived from the second detector connected to the secondary winding, to the other end of said resistor; an electron discharge device having a cathode, a pair of grids and a pair of anodes; a relay coil having its ends connected to the anodes of said device; a rectifier having a plate and a cathode; a resistor across which part of the voltage developed by said rectifier is applied; a circuit for subjecting the detector connected to the tuned primary winding of the intermediate frequency transformer to the voltage across said last mentioned resistor; a connection connecting the cathode of said rectifier to one of said anodes and one end of said relay coil which is connected between the said anodes of said electron discharge device; a connection connecting the grid of said device associated with the other anode of said device, to an intermediate point on said first mentioned resistor; and a resistor connecting the cathode of said electron discharge device to ground; said last mentioned grid connection serving to control current flow through said coil thereby controlling the operation of said motor.

References Cited in the file of this patent

UNITED STATES PATENTS

| | | |
|---|---|---|
| 1,483,400 | Wilbur | Feb. 12, 1924 |
| 2,151,773 | Koch | Mar. 28, 1939 |
| 2,326,737 | Andrews | Aug. 17, 1943 |
| 2,496,446 | Dean | Feb. 7, 1950 |
| 2,499,584 | Hills | Mar. 7, 1950 |
| 2,541,017 | Alexander | Feb. 13, 1951 |
| 2,652,486 | Guyton | Sept. 15, 1953 |
| 2,664,489 | Dickey | Dec. 29, 1953 |
| 2,666,853 | O'Brien | Jan. 19, 1954 |
| 2,737,581 | Guyton | Mar. 6, 1956 |
| 2,747,154 | Abrams | May 22, 1956 |
| 2,773,193 | Andrews | Dec. 4, 1956 |
| 2,861,178 | Guyton | Nov. 18, 1958 |